Nov. 25, 1958   G. M. FLYNN   2,861,540
APPARATUS FOR WASHING FLUX FROM AND COATING
THE SIDE SEAMS OF TRAVELLING CAN BODIES
Filed Sept. 14, 1953   3 Sheets-Sheet 1
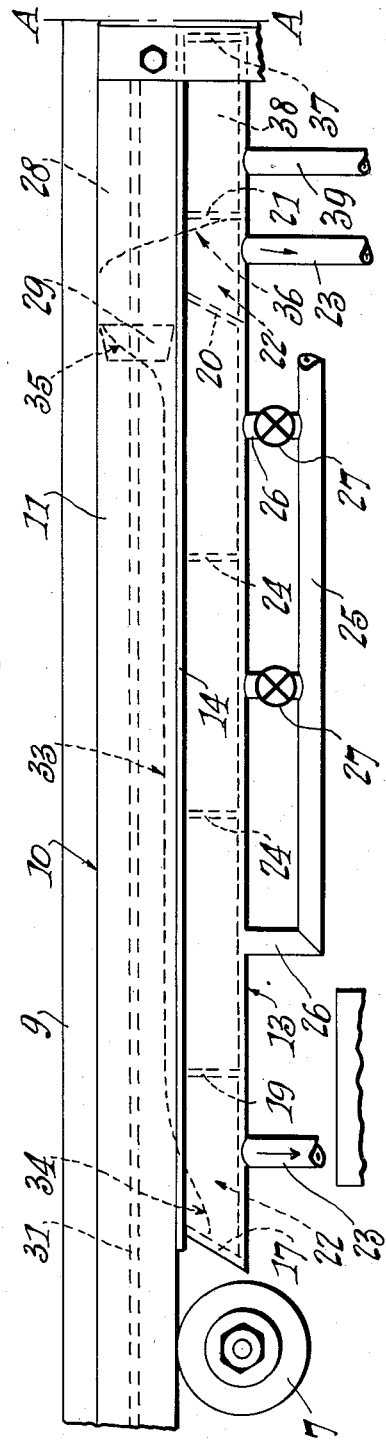
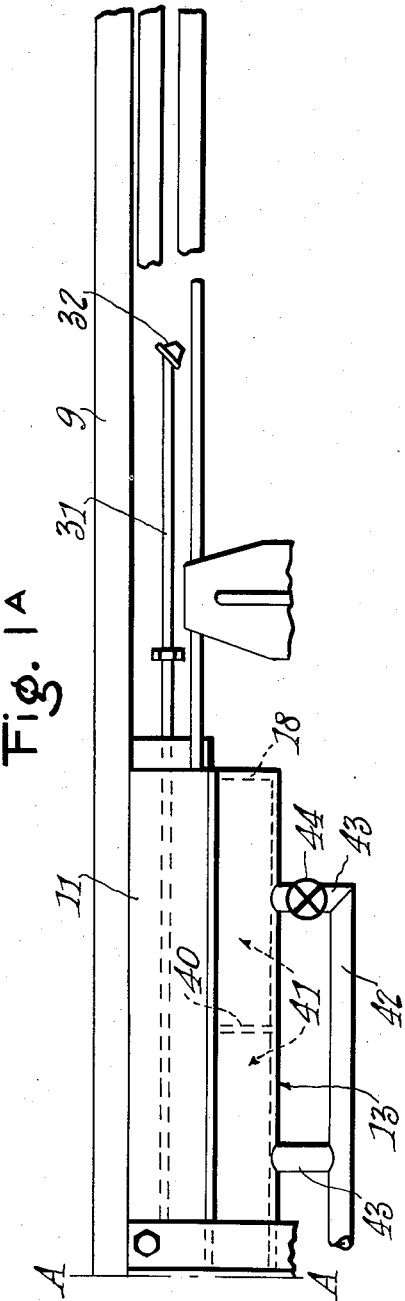
INVENTOR.
GEORGE M. FLYNN
BY
Mason, Porter, Diller & Stewart
HIS ATTORNEYS

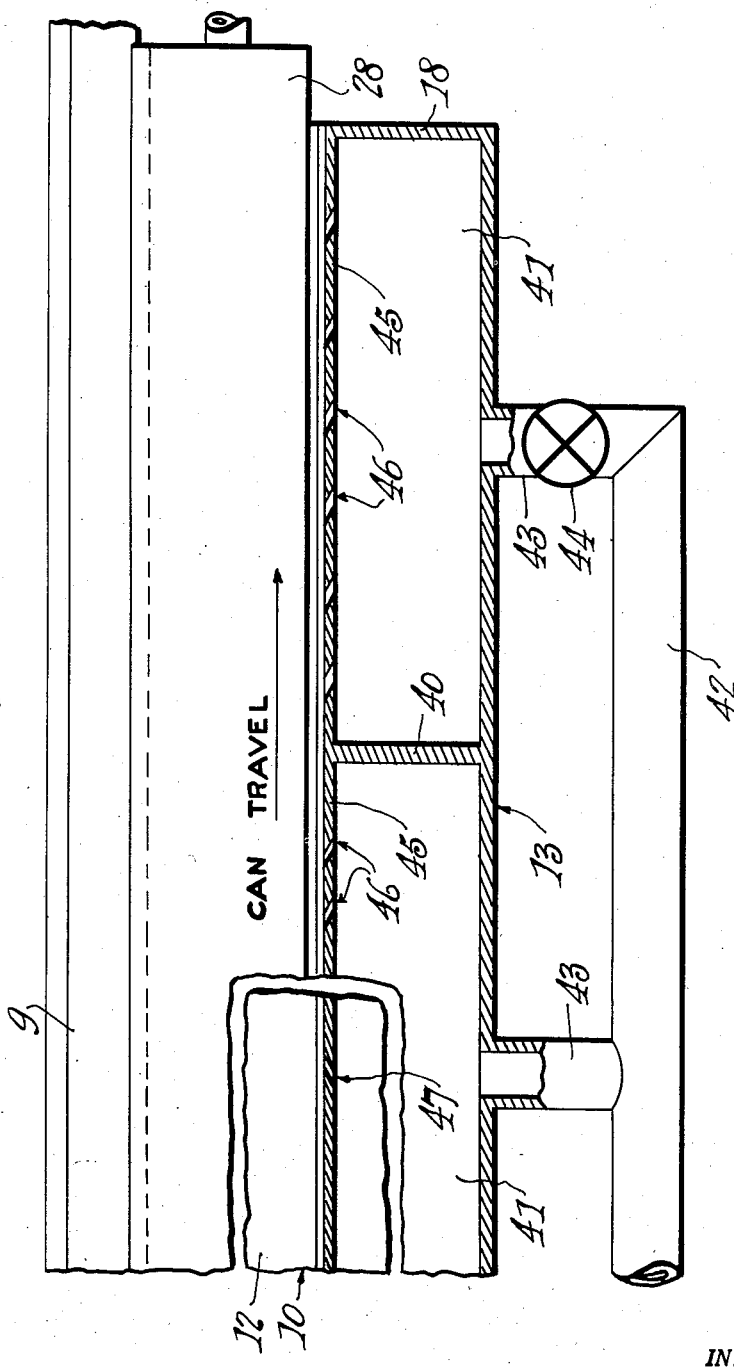

Nov. 25, 1958 G. M. FLYNN 2,861,540
APPARATUS FOR WASHING FLUX FROM AND COATING
THE SIDE SEAMS OF TRAVELLING CAN BODIES
Filed Sept. 14, 1953 3 Sheets-Sheet 3
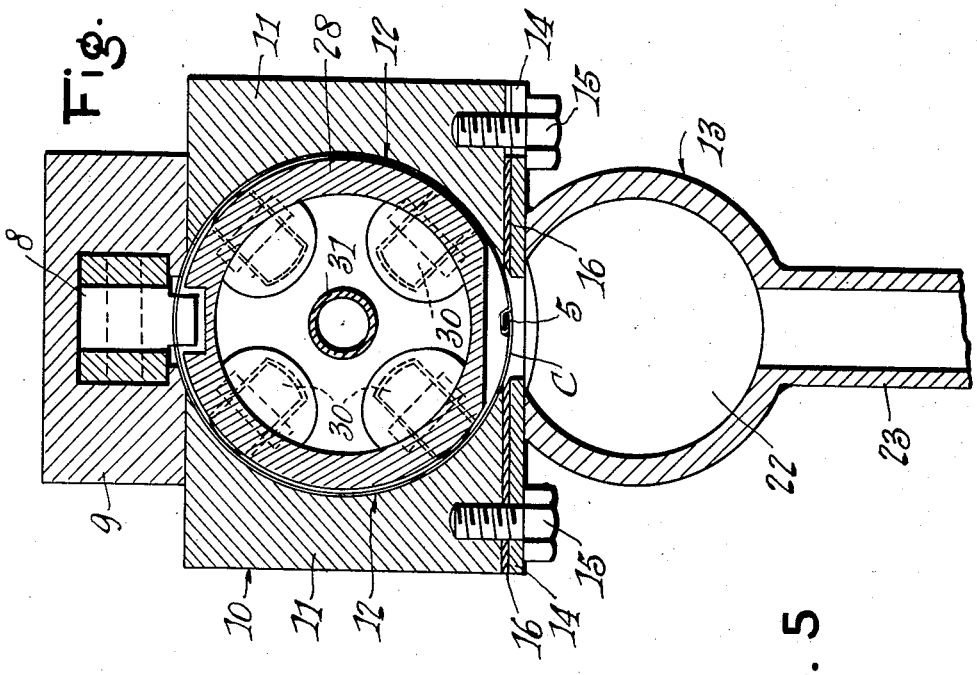
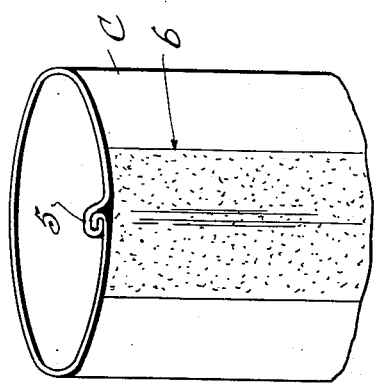
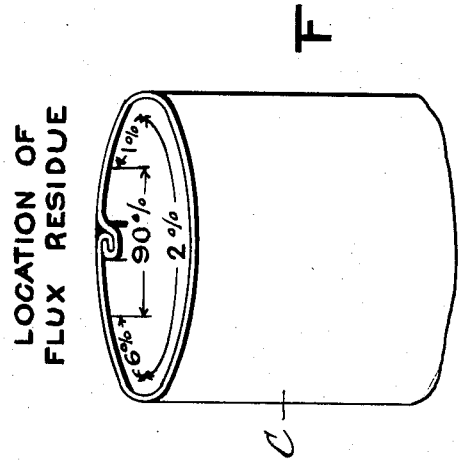
INVENTOR.
GEORGE M. FLYNN
BY
Mason, Porter, Diller & Stewart
HIS ATTORNEYS

United States Patent Office

2,861,540
Patented Nov. 25, 1958

2,861,540

APPARATUS FOR WASHING FLUX FROM AND COATING THE SIDE SEAMS OF TRAVELLING CAN BODIES

George M. Flynn, Oak Park, Ill., assignor to Continental Can Company, Inc., New York, N. Y., a corporation of New York Application September 14, 1953, Serial No. 379,811

13 Claims. (Cl. 118—73)

The invention relates generally to the art of making cans and primarily seeks to provide a novel apparatus for washing off, with water, the excess flux and flux residue from both the inside and outside of can bodies immediately after the solder bonding and wiping of the side seams thereof and while they are being rapidly conveyed in processional order in the body maker and side seamer.

It is known that flux or flux residue is objectionable on cans because of the bad effects on the cans and also products contained therein. For example, it has been observed that some fluxes will cause a turbid condition in beer, and discoloration of other products such as shrimp and cranberries has been brought about by flux contact. This objectionable condition is aggravated when strong, corrosive fluxes are employed, as when the can bodies are being formed from black iron blanks. Such fluxes are necessary in order to assure the efficient solder bonding of the side seams of can bodies formed from black iron blanks. It has been determined that heat generated during the solder bonding of can body side seams serves to volatilize the flux and cause a boiling off and spattering effect resulting in a re-deposition or dispersion of flux over the insides of the can bodies. The water component of the flux is evaporated, and the residue is distributed in varying degree over the can body interiors. Flux is similarly driven out of the side seams onto portions adjacent the seams externally, as well as internally of the can bodies and often results in corrosion and rusting which interferes with proper application of protective and decorative coatings. Therefore, it is an object of the present invention to provide a novel apparatus for effectively bathing all portions of the rapidly travelling can bodies likely to have flux or flux residue thereon in water so as to remove the flux or flux residue and prevent the objectionable effects to which reference has been made.

In its more detailed nature the invention resides in providing an improved apparatus of the character stated including in combination with the usual outside horse and the conveyor means which feeds the cans in processional order past the soldering roll and the wiper roll, means for maintaining a free flowing bath of water in the lower portion of the horse through which the side seams of the can bodies travel, thereby to cause the can body side seams and portions adjacent thereto to travel through and be washed free of flux and flux residue by the water.

An object of the invention is to provide an apparatus of the character stated wherein is included baffle means effective to direct a portion of the water bath over the whole of the interior of each passing can body so as to assure thorough washing of the whole interior of each can body as well as external portions along and adjacent to the solder cut.

Another object of the invention is to provide an apparatus of the character stated wherein the means for maintaining the washing bath comprises a housing extending along and sealed against the bottom of the horse and having a drain chamber at each end thereof defined by an end closure wall and a weir wall spaced inwardly from the closure wall, means for supplying water to the housing in the space between the weir walls to flow over said weir walls into the drain chambers, the upper edges of the weir walls being placed to maintain a level of free flowing water well up in the lower portion of the horse, and drains leading away from the drain chambers and having a draining capacity always greater than the flow capacity of the water supplying means so as to assure against flooding of water endwise out of the housing.

Another object of the invention is to provide an apparatus of the character stated wherein the water directing baffle means comprises a body at least partially cylindrical in shape and supported with its cylindrical exterior spaced inwardly from the horse interior so that can bodies can pass thereover as they are conveyed through the water bath in the horse, said baffle including a tapered leading end portion for directing water over the interiors of the can bodies.

Another object of the invention is to provide an apparatus of the character stated wherein there are included a spraying nozzle placed to direct a protective coating spray onto the side seams interiorly of the travelling can bodies after they have been washed, and a duct extending longitudinally within the horse for supplying the coating material to the nozzle, and wherein the water diverting baffle forms a support for said duct.

Another object of the invention is to provide an apparatus of the character stated wherein the water diverting baffle is supported on and centered by rollers engaging the interiorly presented, can body guiding surfaces of the horse.

Another object of the invention is to provide an apparatus of the character stated wherein there is included means for directing air under pressure against the water diverting baffle and about the same in the space between the baffle and the horse and counter to the direction in which the can bodies are conveyed so as to be effective to drive off residual water from the can bodies and dry the same, said residual water being driven back into the adjacent drain chamber to be drained therefrom without any thereof passing out at the discharge end of the housing.

Another object of the invention is to provide an apparatus of the character stated wherein there is included in the housing a vacuum chamber placed endwise of and beyond the drain chamber and opposite the water diverting baffle near the discharge end of the housing and having connection with a vacuum source so as to be effective to withdraw residual water from the space between the baffle and the horse.

A still further object of the invention is to provide an apparatus of the character stated wherein are broadly combined means for washing can bodies both internally and externally as they are being conveyed in processional order, means for drying the can bodies, and means for applying a protective coating over the side seams internally of the can bodies, all being accomplished in close progressive sequence immediately after the solder bonding and wiping of the side seams.

With the above and other objects in view that will hereinafter appear, the nature of the invention will be more clearly understood by reference to the following detailed description, the appended claims and the several views illustrated in the accompanying drawing.

In the drawings:

Figures 1 and 1A, when considered as joined at the line A—A, together comprise a somewhat diagrammatic side elevation illustrating the invention as applied on a can body maker.

Figure 2 is an enlarged fragmentary side elevation at the position of the air chambers, said chambers being shown in longitudinal section.

Figure 3 is an enlarged vertical cross section taken through the apparatus at the position of the water spreading baffle.

Figure 4 is a fragmentary perspective view looking at a solder cut portion of a can body.

Figure 5 is a view similar to Figure 4 looking into the interior of a can body at the side seam and indicating diagrammatically how flux to be washed from the can bodies may be distributed thereabout.

It is well known that in the conventional manufacturing of can bodies, the rectangular body blanks are fed along step by step through notching and flanging stations and then have flux applied to the marginal edges or flange portions which are to be formed into the can body side seams. The blanks are shaped about a horn and the flanges are brought together in a side seam and bumped to bring the interlocking and overlapping plies of the seam structures into intimate contact. Thereafter, the feeding of the can bodies is taken over by a continuously travelling conveyor which rapidly feeds the can bodies in processional order over the usual soldering roll and the wiper roll disposed adjacent to and just beyond the soldering roll and which is effective to wipe excess solder from the can bodies externally thereof and along the side seams while the solder is still in the molten state.

A can body is somewhat diagrammatically illustrated at C in Figure 4, the same being shown as having a side seam 5 of acceptable form. Such can bodies after passing through the solder bonding station and having the excess solder removed therefrom by the wiping roll will have the usual solder cut extending therealong in the manner indicated at 6 in Figure 4. The excess solder wiping roll is somewhat diagrammatically indicated at 7 in Figure 1 and is to be considered as disposed immediately beyond the soldering roll in the conventional body maker structure, although in some body makers sweater burners may be interposed immediately between the soldering roll and the wiping roll for facilitating the sweating in of the solder. The wiping roll 7 illustrated in Figure 1 is to be considered a diagrammatic illustration of the solder bonding station whether it be considered as including the soldering roll and the wiping roll, or said soldering roll and the wiping roll with a sweater burner equipment interposed therebetween.

It is well known that flux is applied to the marginal portions of the can body blanks which are formed into the can body side seams, and this flux is applied to facilitate the solder bonding of the side seams. It is much more difficult to provide an efficient solder bond when can bodies are being made up from mild steel or black iron blanks, and in such instances, strong corrosive fluxes are employed. It is highly desirable to remove all excess flux or flux residue from the can bodies, both internally and externally, in order to insure against contamination or discoloration of products contained in the cans, and also to prevent corrosion and rusting of can body portions. It has been found that the heat to which the can bodies are subjected while passing through the solder bonding station serves to volatilize the flux. There is a violent boiling off and spattering of the flux which causes a redeposition thereof on the inside of the can body. It has been noted that approximately 90% of the flux residue is located within a center stripe approximating one inch in width and extending along the interior of can bodies at the seam position as indicated in Figure 5. Approximately 6% will be located within the stripe quarter indicated at the left of said central seam stripe as shown in Figure 5, approximately 1% will be disposed along the quarter to the right of said central seam stripe as shown in Figure 5, and the remaining 2% will be disposed along the upper half of the can body interior as indicated in said Figure 5. It is very difficult to wash off the flux after the can bodies cool, but according to the present invention the washing of the can bodies at a temperature of 700° F., right after the solder wiping is accomplished and while the solder stripe is still in a molten state, is found to be highly efficient. Not only is the washing off of the flux accomplished more efficiently, but the washing water acts as a solder cooler and eliminates the need for the provision of accessory cooling devices.

In passing to and through and beyond the solder bonding and wiping station, the can bodies are rapidly conveyed in processional order by a chain flight 8 running in a guide 9 atop an outside horse generally designated 10. See Figure 3. These are conventional and well known structures and the horse includes longitudinal laterally spaced members 11 having opposed, part cylindriform surfaces 12 forming a supporting guideway for the can bodies C.

In the practical development of the invention, there is provided a housing generally designated 13 and having supporting flange equipment 14 secured at 15 to the horse, there being included an interposed sealing gasket 16. The housing has an advance end closure 17 and a discharge end closure 18. A weir wall 19 is spaced inwardly from the advance end closure 17 and a similar weir wall 20 is spaced inwardly from an intermediate wall 21. The advance end closure wall 17 and the adjacent weir wall 19 cooperate in forming a drain chamber 22 at the advance end of the housing, and the weir wall 20 and the adjacent intermediate wall 21 cooperate in defining a similar drain chamber 22 toward the discharge end of the housing. Each of the drain chambers 22 is equipped with a drain 23 for delivering drain water therefrom and directing the same to a waste means or collection means, or the same may be cooled and recirculated.

The space within the housing 13 between the weir walls 19 and 20 provides a water supply chamber which may or may not be equipped with divider walls 24 and to which water is supplied through a manifold duct 25 and individual supply ducts 26, one for each divided chamber, and all of the individual ducts 26, or all thereof except the foremost one nearest the advance end closure wall 17, may be equipped with flow control valves 27. It is to be understood that the rate of flow of the water entering the housing through the duct means 25, 26 is accurately controlled with relation to the take-off capacity of the drains 23. This rate of supply will always be less than the capacity of the drains 23 to take off the water in a manner for assuring against uncontrolled flowing of any of the water over the end extremities of the housing 13. In other words, the drains 23 have a draining capacity always greater than the flow capacity of the water supplying means.

A baffle generally designated 28 is mounted in the horse 10 in the manner clearly illustrated in the composite Figure 1, 1A and in Figure 3, and is wholly or at least partially cylindrical in form and includes a tapered advance end portion 29 as illustrated in Figure 1. The baffle is supported on and centered by rollers 30 carried thereby and which engage internal surfaces of the horse members 11 in the manner clearly illustrated in Figure 3. The baffle is so dimensioned, and the rollers 30 so support the same, as to provide an annular space surrounding the baffle and inwardly of the part-cylindrical inner surfaces 12 of the horse members 11, through which space the can bodies C may freely pass, guided by the horse surfaces 12 and passing longitudinally along and over the baffle 28.

A spray tube 31 extends through and is supported by the baffle or distributor 28, and a spray head or nozzle 32 is mounted on the end of the tube as illustrated in the composite Figure 1, 1A. The nozzle and tube equipment thus supported serves as a striping means for applying a protective stripe over the can body side seams internally of the can bodies after they have been washed and dried in the manner to be described hereinafter.

The rate of flow of the water supply through the duct means 25, 26 is so controlled, and the weir walls 20 are so located, as to maintain a level of water well up in the horse, somewhat as indicated at 33 in Figure 1, the water passing over the weir wall 19 at the advance end of the housing and down as at 34 into the advance drain chamber 22, and being diverted or distributed upwardly about the baffle as at 35 and then passing down into the trailing end drain chamber 22 somewhat in the manner indicated at 36. It will thus be apparent that the lower, side seam equipped portions of the can bodies will be rapidly drawn through the bath of water maintained at 33 in the lower portion of the horse, and that the water will serve to thoroughly wash the portions of the can bodies adjacent the side seams, both internally and externally, as the can bodies are fed along toward the baffle 28. As the can bodies pass over the baffle the whole of the interior and exterior wall portions thereof will be bathed and washed by the water diverted about the baffle in the manner clearly indicated at 35, 36 in Figure 1.

A divider wall 37 may be provided in the housing 13 to cooperate with the adjacent wall 21 in forming a vacuum chamber 38 which may be connected at 39 with any suitable vacuum source (not shown). An intermediate wall 40 may also be provided for dividing the housing space between the walls 37 and 18 into two air blast chambers 41 which may be served with air under pressure through a manifold 42 and individual connector ducts 43. At least one of the individual ducts 43 may be equipped with a control valve 44, and it is to be understood that the chambers 41, and even possibly the vacuum chamber may be equipped with ceiling plate means 45. The ceiling plate means over the air chamber 41 are provided with air slots 46 angled so as to direct air blasts against the baffle 28 and into the space surrounding the same within the horse in a direction counter to the direction of movement of the travelling can bodies. This provision of air blasts and the direction thereof serve not only to dry the washed can bodies but also to direct residual washing water which may tend to cling to the can bodies and the baffle back toward and into the adjacent drain chamber 22. If desired, one or more air slots 47 angled in other directions may be provided for facilitating the drying action. It is to be understood also that if ceiling plate means is provided over the vacuum chamber 38, said ceiling means will also be equipped with slots communicating between the interior of the horse, or, in other words, the space surrounding the baffle 28. This vacuum chamber means also facilitates the drying action and additionally assures against carrying of any residual water beyond the end of the housing.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, means for conveying can bodies in processional order and in longitudinally spaced relation with their side seams in alignment, means maintaining a free flowing bath of water through which the can bodies are conveyed for washing flux and flux residue from the can bodies both externally and internally as they are being conveyed, said last named means including a distributer supported internally of the moving can bodies for diverting the bath water over the whole interiors of the moving can bodies, means for drying the can bodies as they are being conveyed, and means for applying a protective striping over the can body side seams internally of the can bodies as they are being conveyed and including a coating material supply duct extending through and supported by the distributer.

2. Apparatus of the character described comprising, a horizontal and longitudinally extending horse forming a guideway for can bodies, means for conveying can bodies in longitudinally spaced relation along in said horse, and means for maintaining a free flowing bath of water in the lower portion of the horse through which side seams of the can bodies travel, thereby to cause the can body side seams and portions of the can bodies adjacent thereto to travel through and be washed free of flux and flux residue by the water, and wherein there is also included baffle means and means stationarily supporting the baffle means to lie interiorly of the horse and in the water bath so that the can bodies are movable therealong and thereover and the baffle means will serve to distribute water over interior wall portions of the can bodies.

3. Apparatus of the character described comprising, a horizontal and longitudinally extending horse forming a guideway for can bodies, means for conveying can bodies in longitudinally spaced relation along in said horse, and means for maintaining a free flowing bath of water in the lower portion of the horse through which side seams of the can bodies travel, thereby to cause the can body side seams and portions of the can bodies adjacent thereto to travel through and be washed free of flux and flux residue by the water, and wherein there is also included baffle means and means stationarily supporting the baffle means to lie interiorly of the horse and in the water bath, said baffle means being at least in part cylindrical in shape and having its external wall portions spaced a limited distance inwardly of the opposing horse wall portions and including a tapered leading end portion effective to distribute water over interior wall portions of the can bodies.

4. In apparatus of the character described, a horizontal and longitudinally extending horse composed of opposing members presenting opposing part cylindrical can body guiding faces and spaced to present downwardly and upwardly presented longitudinal slotways, can body conveying means operating through the upper slotway to convey can bodies through the horse in processional order and in longitudinally spaced relation and with their side seams in line along the lower slotway, a housing extending along and sealed against the bottom of the horse and having a drain chamber at each end thereof defined by an end closure wall and a weir wall spaced inwardly from the closure wall, means for supplying water to the housing in the space between the weir walls to flow over said weir walls into the drain chambers, the upper edges of the weir walls being placed to maintain a level of free flowing water extending well up through the lower slotway into the horse, and drains leading away from the drain chambers and having a draining capacity always greater than the flow capacity of the water supplying means so as to assure against flooding of water endwise out of the housing.

5. Apparatus as defined in claim 4 wherein there is also included baffle means and means stationarily supporting the baffle means to lie interiorly of the horse and in the water bath so that the can bodies are movable therealong and thereover and the baffle means will serve to distribute water over interior wall portions of the can bodies.

6. Apparatus as defined in claim 4 wherein there is also included baffle means and means stationarily supporting the baffle means to lie interiorly of the bodies and in the water bath, said baffle means being at least in part cylindrical in shape and having its external wall portions spaced a limited distance inwardly of the opposing horse wall portions and including a tapered leading end portion effective to distribute water over interior wall portions of the can bodies.

7. Apparatus as defined in claim 4 wherein there is also included baffle means and means stationarily supporting the baffle means to lie interiorly of the bodies and in the water bath, said baffle means being at least in part cylindrical in shape and having its external wall portions spaced a limited distance inwardly of the opposing horse wall portions and including a tapered leading end portion effective to distribute water over interior wall portions of the can bodies, said baffle means being supported and centered on rollers mounted on the baffle and engaging interior wall portions of the horse.

8. Apparatus as defined in claim 4 wherein there is also included baffle means and means stationarily supporting the baffle means to lie interiorly of the bodies and in the water bath, said baffle means being at least in part cylindrical in shape and having its external wall portions spaced a limited distance inwardly of the opposing horse wall portions and including a tapered leading end portion effective to distribute water over interior wall portions of the can bodies, said baffle means being supported and centered on rollers mounted on the baffle means and engaging interior wall portions of the horse, there being included also means for drying the can bodies, a duct extending through and supported by the baffle means, and a nozzle on the duct through which to spray a protective coating supplied through the duct onto the side seams interiorly of the can bodies after they are dried.

9. Apparatus of the character described, comprising, a horizontal and longitudinally extending horse forming a guideway for can bodies, means for conveying can bodies in longitudinally spaced relation along in said horse, and means for maintaining a free flowing bath of water in the lower portion of the horse through which side seams of the can bodies travel, thereby to cause the can body side seams and portions of the can bodies adjacent thereto to travel through and be washed free of flux and flux residue by the water, and wherein there is also included baffle means and means stationarily supporting the baffle means to lie interiorly of the horse and in the water bath so that the can bodies are movable therealong and thereover and the baffle means will serve to distribute water over interior wall portions of the can bodies, and means for directing air under pressure against the baffle means and about the same in the space between the baffle means and the horse and counter to the direction in which the can bodies are conveyed for drying the can bodies.

10. Apparatus of the character described comprising, a horizontal and longitudinally extending horse forming a guideway for can bodies, means for conveying can bodies in longitudinally spaced relation along in said horse, and means for maintaining a free flowing bath of water in the lower portion of the horse through which side seams of the can bodies travel, thereby to cause the can body side seams and portions of the can bodies adjacent thereto to travel through and be washed free of flux and flux residue by the water, and wherein there is also included baffle means and means stationarily supporting the baffle means to lie interiorly of the horse and in the water bath, said baffle means being at least in part cylindrical in shape and having its external wall portions spaced a limited distance inwardly of the opposing horse wall portions and including a tapered leading end portion effective to distribute water over interior wall portions of the can bodies, and means for directing air under pressure against the baffle means and about the same in the space between the baffle means and the horse and counter to the direction in which the can bodies are conveyed for drying the can bodies.

11. Apparatus as defined in claim 4 wherein there is also included baffle means and means stationarily supporting the baffle means to lie interiorly of the horse and in the water bath so that the can bodies are movable therealong and thereover and the baffle means will serve to distribute water over interior wall portions of the can bodies, and means for evacuating a portion of the housing lying opposite the baffle means to bring about a drying of the can bodies immediately after the washing thereof.

12. Apparatus as defined in claim 4 wherein there is also included baffle means and means stationarily supporting the baffle means to lie interiorly of the horse and in the water bath so that the can bodies are movable therealong and thereover and the baffle means will serve to distribute water over interior wall portions of the can bodies, and means for drying the can bodies immediately after the washing thereof and including means for directing air under pressure against the baffle means and about the same in the space between the baffle means and the horse and counter to the direction in which the can bodies are conveyed.

13. Apparatus as defined in claim 4 wherein there is also included baffle means and means stationarily supporting the baffle means to lie interiorly of the horse and in the water bath so that the can bodies are movable therealong and thereover and the baffle means will serve to distribute water over interior wall portions of the can bodies, means for evacuating a portion of the housing lying opposite the baffle means, and means for drying the can bodies immediately after the washing thereof and including means for directing air under pressure against the baffle means and about the same in the space between the baffle means and the horse and counter to the direction in which the can bodies are conveyed.

References Cited in the file of this patent

UNITED STATES PATENTS

| Number | Name | Date |
|---|---|---|
| 1,056,291 | Nazel | Mar. 18, 1913 |
| 1,480,790 | Stanley | Jan. 15, 1924 |
| 1,737,938 | Miller | Dec. 3, 1929 |
| 1,918,197 | Sebell | July 11, 1933 |
| 2,166,598 | Kronquest | July 18, 1939 |
| 2,220,107 | Holloway | Nov. 5, 1940 |
| 2,223,312 | Briggs | Nov. 26, 1940 |
| 2,279,686 | Kerlin | Apr. 14, 1942 |
| 2,301,188 | Bard | Nov. 10, 1942 |
| 2,305,387 | Pearson | Dec. 15, 1942 |
| 2,380,968 | Kimmig et al. | Aug. 7, 1945 |
| 2,430,219 | Elser | Nov. 4, 1947 |
| 2,455,785 | Larson | Dec. 7, 1948 |
| 2,461,559 | Martin et al. | Feb. 15, 1949 |
| 2,480,358 | Curtis et al. | Aug. 30, 1949 |
| 2,652,841 | Kurt | Sept. 22, 1953 |